Oct. 7, 1958 A. A. WINSLOW 2,855,229
CONNECTION FOR INDICATOR DIALS OR THE LIKE
Filed Aug. 3, 1956 2 Sheets-Sheet 1

INVENTOR.
Arnold A. Winslow.
BY
HIS ATTORNEY.

Oct. 7, 1958  A. A. WINSLOW  2,855,229
CONNECTION FOR INDICATOR DIALS OR THE LIKE
Filed Aug. 3, 1956  2 Sheets-Sheet 2
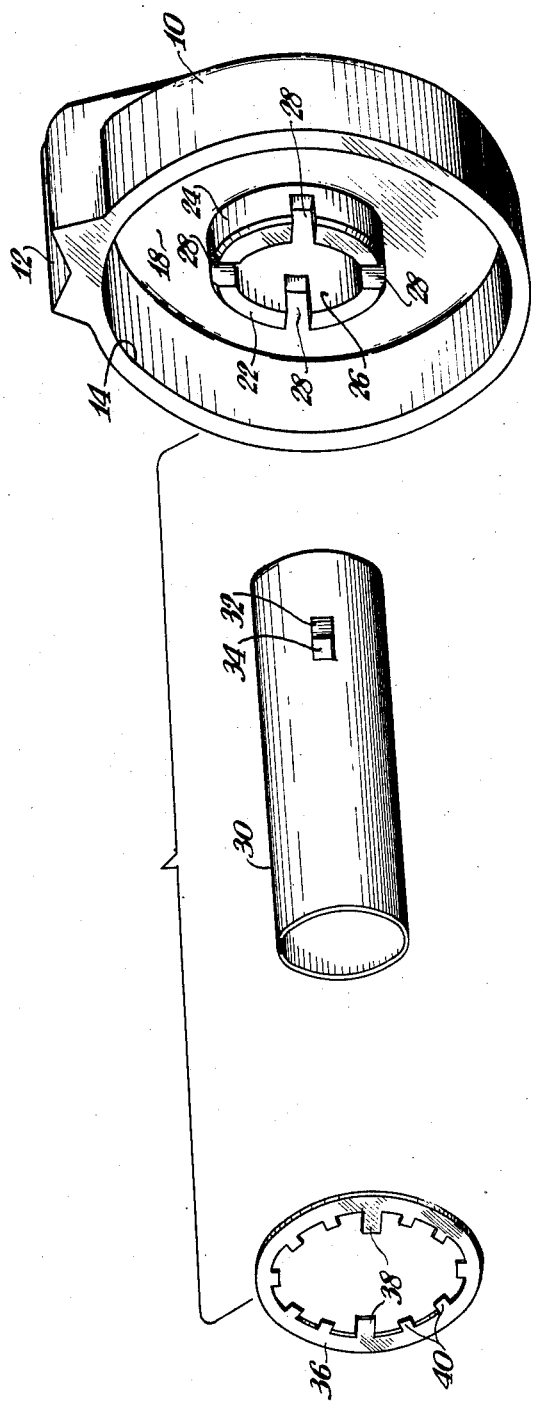
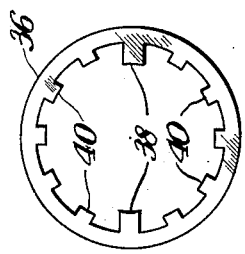
*Fig. 3.*
*Fig. 4.*
INVENTOR.
*Arnold A. Winslow*
BY
HIS ATTORNEY.

United States Patent Office 2,855,229
Patented Oct. 7, 1958

2,855,229

CONNECTION FOR INDICATOR DIALS OR THE LIKE

Arnold Algird Winslow, Greensburg, Pa., assignor to Robertshaw-Fulton Controls Company, Greensburg, Pa., a corporation of Delaware Application August 3, 1956, Serial No. 602,008

4 Claims. (Cl. 287—53)

This invention relates to a new and improved connection for fastening dials, knobs, handles, hand-wheels or the like to shafts, spindles, bushings, etc. More particularly, the present invention relates to a connection for attaching an indicator dial to a tubular shaft so as to prevent both rotary and axial relative movement between the indicator dial and the shaft.

A connection embodying the elements and novel features of the present invention contemplates an assembly of only three parts. The first part comprises a dial or the like having a plurality of cavities therein and provided with a hub or collar in one of the cavities defining a plurality of recesses. The second part is a shaft having a plurality of projections thereon, and the third part is a flexible lock washer or retaining means provided with a plurality of tabs and teeth thereon. The three parts of the assembly are connected by seating one end of the shaft in one of the cavities in the dial and thereafter affixing the lock washer on the peripheral surface of the hub or collar.

When the three parts are in assembled engagement, relative rotation between the parts is prevented by means of the shaft projections being seated within the recesses defined by the hub whereas axial separation of the parts is prevented by means of the cooperation between the shaft projections and the washer tabs and the biting engagement between the teeth on the washer and the peripheral surface of the hub.

Therefore, the primary object of the present invention is to connect a dial or the like to a shaft and eliminate both relative rotary movement and axial movement between the dial and the shaft.

Another object of the present invention is to connect a dial or the like to a shaft by using an assembly of parts including a dial having a plurality of cavities therein.

Another object of the invention is to prevent relative rotation between a dial or the like and a shaft in a connection including a cavity in the dial having a hub or collar therein defining a plurality of recesses.

Another object of the present invention is to prevent relative rotation between a dial or the like and a shaft in a connection including a shaft having a plurality of projections thereon.

Another object of the present invention is to prevent axial separation between a dial or the like and a shaft in a connection including a resilient lock washer or retaining means provided with a plurality of tabs and teeth thereon.

Other objects and advantages of the present invention will become apparent from the following description taken in connection with the accompanying drawings wherein:

Fig. 3 is a detailed view of one of the parts of the assembly; and

Fig. 4 is an exploded perspective view of the connection showing the three parts prior to assembly.

Figure 1:
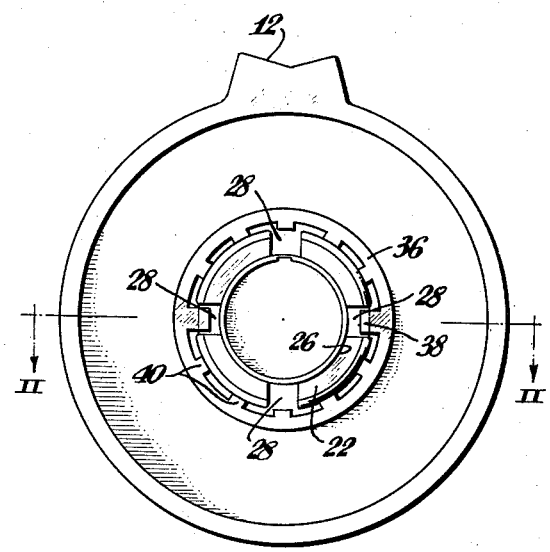
Fig. 1 is a plan view of the connection showing the three parts of the assembly in assembled engagement.

Referring more particularly to the drawings, Fig. 1 to 4 inclusive, show a preferred embodiment of the invention wherein the assembly of parts includes an indicator dial or the like 10 having an indicator 12 integrally formed thereon and provided with a plurality of cavities or bores 14 and 16 therein, the bore 14 being substantially larger in diameter than bore 16. Bore 14 defines an inner wall 18 within dial 10 and bore 16 defines another inner wall 20 therein.

A hub or collar 22 extends from the wall 18 within bore 14 and defines an annular outer wall 24 and a third annular bore 26. The outer wall 24 of hub 22 extends substantially perpendicularly from dial inner wall 18, and the bore 26 in hub 22 has a diameter substantially equal in size to the diameter of the small dial bore 16, the bore 26 thus forming an extension of dial bore 16. The hub 22 is also provided with a plurality of pairs of diametrically opposed recesses 28 therein, the recesses 28, as best shown in Fig. 1, extending from the inner hub bore 26 to the outer hub wall 24.

Figure 2:
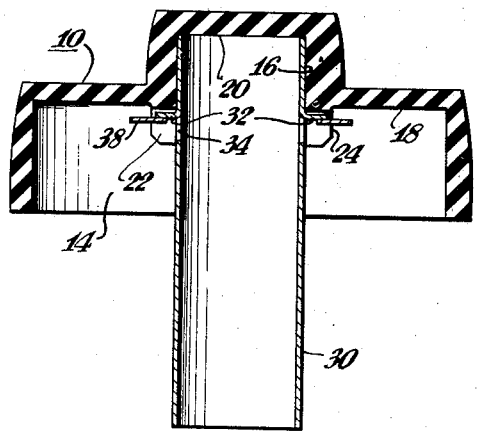
Fig. 2 is a section taken along the line II—II of Fig. 1.

As shown in Figs. 2 and 4, the second part of the assembly comprises a tubular shaft 30 provided with a pair of diametrically opposed projections or ears 32 extending therefrom. In the assembled position of the dial and the tubular shaft 30, as best shown in Fig. 2, a portion of the shaft 30 is received within dial bore 16 and the projecting ears 32 on the shaft are adapted to seat within a pair of the diametrically opposed recesses 28 in the hub 22. Since all of the hub recesses 28 are identical in size, the shaft ears 32 can be seated in either pair of diametrically opposed recesses 28.

In the preferred embodiment of the invention, the ears 32 are struck from the body of tubular shaft 30 although it will be apparent that the ears 32 could be formed on the shaft by any other suitable means or a pair of ears separate and distinct from the shaft 30 could be attached to the periphery thereof. It will also be noted in Fig. 2 that the ears 32 struck from the body of shaft 30 create a pair of diametrically opposed apertures 34 in the body of the shaft.

The third component of the assembly comprises a flexible retaining means or lock washer 36 provided with a pair of diametrically opposed tabs 38 projecting radially inwardly from the inner periphery of the washer and provided with a plurality of tangs or teeth 40 also projecting radially inwardly from the inner periphery of the washer. As can best be seen in Fig. 3, the length of the tabs 38 on lock washer 36 is somewhat greater than the length of teeth 40, the purpose of the difference in length to be discussed more in detail hereinafter. Furthermore, the inner diameter of the washer 36 taken at the tips of teeth 40 is slightly less than the outer diameter of hub or collar 22 at wall 24, the differences in diameter at the tips of teeth 40 and at the hub wall 24 being especially important from the standpoint of connecting the three components of the assembly as will also be explained more in detail hereinafter.

In assembling the three components for connection, the shaft 30 is first placed within dial bore 16 with the shaft ears 32 seated within a pair of hub recesses 28 as best shown in Fig. 2. The lock washer 36 is then slid axially inwardly along shaft 30 until the tips of the teeth 40 engage the outer wall 24 of the hub 22. Inasmuch as the inner diameter of the lock washer 36, taken at the tips of the teeth 40, is somewhat smaller than the outer diameter of hub 22 at wall 24, the washer teeth must then be forcibly pressed axially along hub 24 until the washer tabs 38 engage the projecting ears 32 on shaft 30. With the washer 36 in this position, the three parts of the assembly are tightly connected.

With the three components of the assembly connected as shown in Figs. 1 and 2, the connection prevents relative rotary movement between the parts of the assembly and also prevents axial separation of the parts. Relative rotary movement between the components is prevented by the shaft ears 32 being seated in hub recesses 28 whereas axial separation of the components is prevented by the engagement of the shaft ears 32 and the washer tabs 38 and the biting engagement of the washer teeth 40 in the hub outer wall 24.

The biting engagement between the washer teeth 40 and the hub outer wall 24 is primarily the result of the flexibility of the washer 36 in combination with the "bowing effect" produced by the two washer tabs 38 when a force is applied to the tabs 38 by the shaft ears 32 to move the washer 36 axially along hub wall 24. When a force is applied tending to axially separate the dial 10 and the tubular shaft 30, the force is transmitted through the shaft ears 32 to the washer tabs 38 and produces a "bowing" or deflection of the washer, the "bowing" or deflection of the washer 36 effecting the movement of the washer teeth 40 into tighter engagement with the hub outer wall 24.

In the matter of selection of materials for the components of the assembly, the dial 10 may be made of any suitable plastic material, such as Bakelite, nylon, Teflon, etc. The tubular shaft 30 may be made of any suitable material, such as metal or plastic, and the lock washer 36 may be made of any suitable material, preferably metal, having sufficient flexibility and hardness to permit "bowing" and biting engagement with the hub outer wall 24.

An indicator and tubular shaft assembly connected in accordance with the preferred embodiment of the present invention has particular utility, for instance, when used in combination with an adjusting shaft or the like or a thermostatic control device. The indicator dial and tubular shaft assembly may be mounted on the end of the adjusting shaft of the thermostatic element by any suitable means, such as a set screw or a sleeve bushing, to provide a combination operating member and indicator dial for the adjusting shaft which may be easily installed and quickly detached.

On the other hand, while only one embodiment of the present invention has been shown and described herein, it will be apparent to those skilled in the art that other modifications in the construction, arrangement and general combination of parts may be variously embodied in connections between knobs, hand-wheels, handles or the like and shafts, spindles, bushing, etc., without departing from the invention as defined in the appended claims.

It is claimed and desired to secure by Letters Patent:

1. In a connection, the combination comprising an indicator dial or the like provided with a plurality of bores therein, a hub in one of said bores having a plurality of recesses therein, a shaft having a portion thereof seated in another of said bores, projections on said shaft seated in a plurality of said recesses for preventing relative rotary movement between said dial and said shaft, and a flexible lock washer positioned on the periphery of said hub for preventing relative axial movement between said dial and said shaft, said lock washer having a plurality of tabs thereon engaging said projections on said shaft to operatively connect said shaft and said lock washer and having a plurality of teeth thereon adapted to bite into said hub to prevent relative axial movement between said dial and said shaft.

2. In a connection as claimed in claim 1 wherein said shaft is hollow and wherein said projections on said shaft comprise a pair of diametrically opposed ears struck from the body of said shaft.

3. An indicator dial or like assembly comprising a dial member having an annular collar projecting from one side thereof, said collar having a substantially flat outer face provided with a radial groove means, a shaft member carried by said dial within said collar and projecting beyond said outer face, said shaft having radial tongue means projecting from the outer surface thereof and seated within said groove means for preventing relative rotation of said members, and a lock washer secured to said collar and having radial tongue means overlying the first said radial tongue means for securing said shaft against axial separation from said dial.

4. An indicator dial or like assembly comprising a dial member having an annular collar projecting from one side thereof, said collar having a substantially flat outer face interrupted by at least one pair of oppositely disposed radial grooves, a shaft member carried by said dial within said collar and projecting beyond said outer face, said shaft having at least one pair of oppositely disposed radial tongues projecting from the outer surface thereof and seated within said grooves respectively for preventing relative rotation of said members, and a lock washer secured to said collar and having at least one pair of radial tongues overlying the first said radial tongues respectively for securing said shaft against axial separation from said dial.

References Cited in the file of this patent

UNITED STATES PATENTS 2,234,097     Tinnerman     Mar. 4, 1941

FOREIGN PATENTS 890,093     France     Oct. 25, 1943